(12) United States Patent
Matsuo et al.

(10) Patent No.: US 11,878,579 B2
(45) Date of Patent: Jan. 23, 2024

(54) VEHICLE UNDERBODY STRUCTURE

(71) Applicant: TOYOTA JIDOSHA KABUSHIKI KAISHA, Toyota (JP)

(72) Inventors: Yasuhide Matsuo, Toyota (JP); Ayaka Kagami, Inazawa (JP); Mutsumi Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 17/542,918

(22) Filed: Dec. 6, 2021

(65) Prior Publication Data

US 2022/0176789 A1 Jun. 9, 2022

(30) Foreign Application Priority Data

Dec. 7, 2020 (JP) .................. 2020-203064

(51) Int. Cl.
*B60K 1/04* (2019.01)
*B62D 25/20* (2006.01)
*B60K 1/00* (2006.01)

(52) U.S. Cl.
CPC ................ *B60K 1/04* (2013.01); *B62D 25/20* (2013.01); *B60K 2001/005* (2013.01); *B60K 2001/0438* (2013.01)

(58) Field of Classification Search
CPC ................ B60K 1/04; B60K 2001/005; B60K 2001/0438; B62D 25/20
See application file for complete search history.

(56) References Cited

U.S. PATENT DOCUMENTS

| 9,758,028 | B2* | 9/2017 | Ikeda | B62D 29/043 |
| 10,720,680 | B2* | 7/2020 | Shen | H01M 50/204 |
| 2012/0312614 | A1 | 12/2012 | Fujiwara et al. | |
| 2013/0189558 | A1* | 7/2013 | Haussmann | H01M 10/658 |
| | | | | 429/120 |
| 2015/0336452 | A1 | 11/2015 | Decker | |
| 2018/0111500 | A1* | 4/2018 | Ogaki | H01M 10/6568 |
| 2019/0074497 | A1* | 3/2019 | Haeusler | H01M 50/224 |
| 2019/0173064 | A1 | 6/2019 | Lee et al. | |
| 2021/0261202 | A1* | 8/2021 | Kawashima | B60K 1/04 |
| 2021/0276405 | A1* | 9/2021 | Okada | H01M 10/6556 |
| 2021/0399356 | A1* | 12/2021 | Ghiotto | H01M 10/63 |
| 2022/0021049 | A1* | 1/2022 | Shieh | B60K 11/02 |
| 2022/0314772 | A1* | 10/2022 | Kim | H01M 50/209 |

FOREIGN PATENT DOCUMENTS

| JP | 2012-256468 A | 12/2012 |
| JP | 2015-224027 A | 12/2015 |
| JP | 2018-527705 A | 9/2018 |

* cited by examiner

*Primary Examiner* — Brian L Swenson
(74) *Attorney, Agent, or Firm* — Dinsmore & Shohl LLP

(57) ABSTRACT

A vehicle underbody structure, including: a case that is provided on a vehicle lower side of a vehicle and has a mount portion on which batteries are mounted; a refrigerant flow passage that is provided on the vehicle lower side of the case and in which heat exchange can take place between the batteries on the mount portion and a refrigerant; and inflow/outflow portions that communicate with the refrigerant flow passage from a vehicle upper side and allow the refrigerant to flow in or flow out between an outside of the refrigerant flow passage and the refrigerant flow passage.

12 Claims, 2 Drawing Sheets

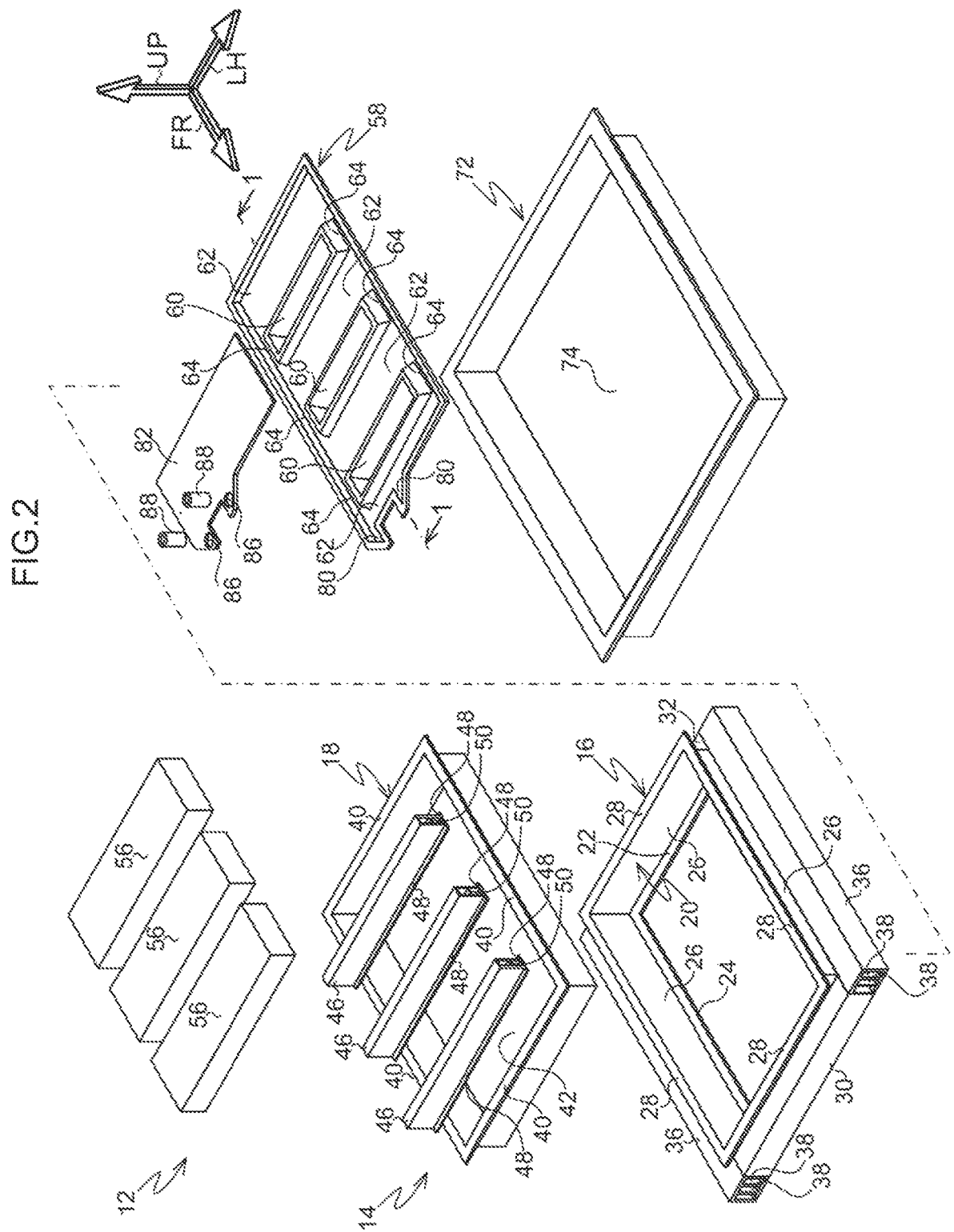

VEHICLE UNDERBODY STRUCTURE

CROSS-REFERENCE TO RELATED APPLICATION

This application is based on and claims priority under 35 USC 119 from Japanese Patent Application No. 2020-203064 filed on Dec. 7, 2020, the disclosure of which is incorporated by reference herein.

BACKGROUND

Technical Field

This disclosure relates to a vehicle underbody structure where a battery case is disposed on the vehicle lower side of a vehicle.

Related Art

For example, Japanese Patent Application Laid-open (JP-A) No. 2015-224027 discloses an underfloor unit where cooling ducts have, for example, substantially U-shaped cross sections that open in the vehicle upward direction. On the open sides of the cooling ducts is disposed a support plate that configures a base body, and the open sides of the cooling ducts are closed by the support plate. Furthermore, the base body is equipped with an armor plate (a protector) substantially in the shape of a flat plate. In a first embodiment of JP-A No. 2015-224027, the cooling ducts are disposed inside channels formed in the armor plate. In a second embodiment of JP-A No. 2015-224027, the cooling ducts are disposed on the armor plate.

In this connection, in this kind of underfloor unit, a supply member to supply a refrigerant from the outside of the cooling ducts to the cooling ducts or a discharge member to discharge the refrigerant in the cooling ducts to the outside of the cooling ducts must be provided. However, as a result of the supply member or the discharge member being provided, the dimension of the underfloor unit in the vehicle up/down direction increases, and it becomes difficult to ensure ground clearance between the road surface and the underfloor unit.

SUMMARY

In view of the circumstances described above, this disclosure obtains a vehicle underbody structure with which ground clearance between a road surface and a refrigerant flow passage can be ensured.

A vehicle underbody structure of a first aspect of the disclosure includes: a case that is provided on a vehicle lower side of a vehicle and has a mount portion on which batteries are mounted; a refrigerant flow passage that is provided on the vehicle lower side of the case and in which heat exchange can take place between the batteries on the mount portion and a refrigerant; and inflow/outflow portions that communicate with the refrigerant flow passage from a vehicle upper side and allow the refrigerant to flow in or flow out between an outside of the refrigerant flow passage and the refrigerant flow passage.

According to the vehicle underbody structure of the first aspect of the disclosure, the batteries are mounted on the mount portion of the case. The flow passage of the refrigerant is set on the vehicle lower side of the mount portion, and when heat is exchanged between the refrigerant flowing through the flow passage and the batteries on the mount portion of the case, the batteries are cooled.

Furthermore, the inflow/outflow portions communicate with the flow passage of the refrigerant from the vehicle upper side, and the refrigerant flows into the refrigerant flow passage from the vehicle upper side via the inflow/outflow portions or flows out from the refrigerant flow passage to the vehicle upper side via the inflow/outflow portions. In this way, the inflow/outflow portions communicate with the refrigerant flow passage from the vehicle upper side. For this reason, ground clearance from the road surface can be ensured.

A vehicle underbody structure of a second aspect of the disclosure is the vehicle underbody structure of the first aspect of the disclosure, further including a frame that is provided on at least one of a vehicle front/rear direction outer side or a vehicle right/left direction outer side of the case and reinforces the case, wherein the inflow/outflow portions are set on at least one of the vehicle front/rear direction outer side or the vehicle right/left direction outer side of the frame.

According to the vehicle underbody structure of the second aspect of the disclosure, the frame is provided on at least one of the vehicle front/rear direction outer side or the vehicle right/left direction outer side of the case. Because of this, the case is reinforced by the frame. Furthermore, the inflow/outflow portions are set on at least one of the vehicle front/rear direction outer side or the vehicle right/left direction outer side of the frame. For this reason, ground clearance from the road surface can be even more effectively ensured.

A vehicle underbody structure of a third aspect of the disclosure is the vehicle underbody structure of the second aspect of the disclosure, wherein each of the frame and the inflow/outflow portions is provided at a vehicle front side of the case.

In the vehicle underbody structure of the third aspect of the disclosure, each of the frame and the inflow/outflow portions is provided at the vehicle front side of the case. Here, private passenger vehicles have a refrigerant flow passage provided on the vehicle rear side of a radiator (heat exchanger) or the like, so access to the radiator (heat exchanger) or the like by the inflow/outflow portions is easy.

A vehicle underbody structure of a fourth aspect of the disclosure is the vehicle underbody structure of any one of the first aspect of the disclosure to the third aspect of the disclosure, wherein the refrigerant flow passage is equipped with extension portions that extend to the inflow/outflow portions.

According to the vehicle underbody structure of the fourth aspect of the disclosure, the refrigerant flow passage is equipped with the extension portions that extend to the inflow/outflow portions. For this reason, the inflow/outflow portions may be configured to open at the vehicle upper sides of the extension portions. For this reason, the configuration of the inflow/outflow portions can be made simple.

A vehicle underbody structure of a fifth aspect of the disclosure is the vehicle underbody structure of the fourth aspect of the disclosure, wherein the refrigerant flow passage and the extension portions are open on their vehicle upper sides, an opening on the vehicle upper side of the refrigerant flow passage is closed by the mount portion, and the regions of openings on the vehicle upper sides of the extension portions that do not coincide with the mount portion in the vehicle up/down direction are closed by the plate portion.

According to the vehicle underbody structure of the fifth aspect of the disclosure, the refrigerant flow passage and the extension portions are open on their vehicle upper sides. The opening on the vehicle upper side of the refrigerant flow passage is closed by the mount portion of the case. For this reason, the number of members between the batteries and the refrigerant can be reduced, and the efficiency with which the batteries are cooled is enhanced. The openings on the vehicle upper sides of the extension portions are closed by the plate portion. For this reason, the extension portions can be integrated with the refrigerant flow passage, and the configurations of the refrigerant flow passage and the extension portions can be simplified.

As described above, in the vehicle underbody structure of the first aspect of the disclosure, ground clearance from the road surface can be ensured, so loads can be inhibited from spreading to the refrigerant flow passage.

Furthermore, in the vehicle underbody structure of the second aspect of the disclosure, ground clearance from the road surface can be even more effectively ensured, so loads can be even more effectively inhibited from spreading to the refrigerant flow passage.

Moreover, in the vehicle underbody structure of the third aspect of the disclosure, access by the inflow/outflow portions to the radiator (heat exchanger) or the like disposed on the vehicle front side of the refrigerant flow passage can be made easy.

Furthermore, in the vehicle underbody structure of the fourth aspect of the disclosure, the configuration of the inflow/outflow portions can be made simple.

Moreover, in the vehicle underbody structure of the fifth aspect of the disclosure, the efficiency with which the batteries are cooled can be enhanced, and the configurations of the refrigerant flow passage and the extension portions can be simplified.

BRIEF DESCRIPTION OF THE DRAWINGS

An exemplary embodiment of the disclosure will be described in detail based on the following figures, wherein:

FIG. 2 is an exploded perspective view showing the vehicle underbody structure pertaining to the embodiment of the disclosure.

DETAILED DESCRIPTION

Figure 1:
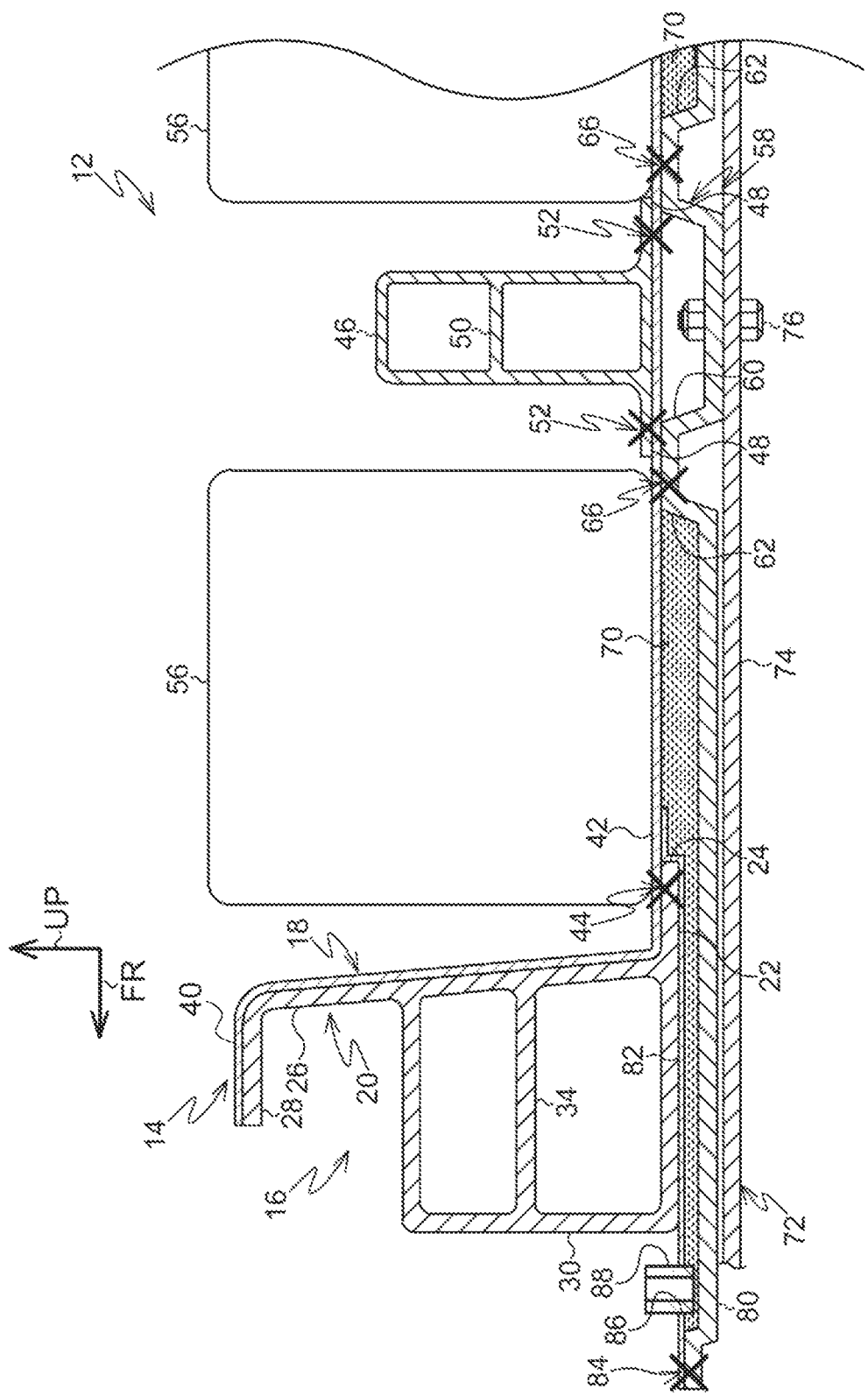
FIG. 1 is a sectional view, taken along line 1-1 of FIG. 2, showing the configuration of a vehicle front-side part of a vehicle underbody structure pertaining to the embodiment of the disclosure.

Next, a vehicle underbody structure pertaining to an embodiment of the disclosure will be described based on FIG. 1 and FIG. 2. Arrow FR appropriately shown in FIG. 1 and FIG. 2 indicates the forward direction (vehicle forward direction) of a vehicle to which the vehicle underbody structure has been applied. Furthermore, arrow UP indicates the vehicle upward direction, and arrow LH indicates a vehicle leftward direction (leftward in the vehicle width direction).

Configuration of Embodiment

As shown in FIG. 1 and FIG. 2, the vehicle underbody structure pertaining to the embodiment is equipped with a battery unit 12. The battery unit 12 is equipped with a case 14. The case 14 is configured to include a frame 16 and a tray 18. The frame 16 is entirely made of a metal such as aluminum or an alloy configured to include aluminum. The frame 16 is equipped with a frame body 20, and the frame body 20 is equipped with a frame bottom portion 22. The frame bottom portion 22 is formed in the shape of flat plate that is rectangular in plan view seen in the vehicle up/down direction. Furthermore, a hole portion 24 is formed in the center of the frame bottom portion 22. The hole portion 24 is rectangular in plan view. Consequently, the frame bottom portion 22 is in the shape of a rectangular frame in plan view.

Frame vertical walls 26 are disposed standing substantially in the vehicle upward direction from the outer peripheral portion of the frame bottom portion 22. Moreover, a frame flange 28 extends in the vehicle forward direction from the end portion on a vehicle upper side of the frame vertical wall 26 on a vehicle front side, and a frame flange 28 extends in the vehicle rearward direction from the end portion on the vehicle upper side of the frame vertical wall 26 on the vehicle rear side. Furthermore, a frame flange 28 extends in the vehicle leftward direction from the end portion on the vehicle upper side of the frame vertical wall 26 on a vehicle left side, and a frame flange 28 extends in a vehicle rightward direction from the end portion on the vehicle upper side of the frame vertical wall 26 on a vehicle right side.

Furthermore, the frame 16 is equipped with a front frame 30 and a rear frame 32. The front frame 30 is also provided on the vehicle lower side of the frame flange 28 on the vehicle front side, and the rear frame 32 is also provided on the vehicle lower side of the frame flange 28 on the vehicle rear side. The lengthwise direction of the front frame 30 and the rear frame 32 generally coincides with the vehicle width direction. These frame flanges 28 are, for example, directly or indirectly secured, from the vehicle lower side of a floor panel that configures a vehicle body of the vehicle, to the floor panel. Because of this, the case 14 is attached to the vehicle body.

As shown in FIG. 1, each of the front frame 30 and the rear frame 32 is hollow in cross-section when cut in a direction orthogonal to the vehicle width direction. The front frame 30 forms a closed cross-section together with the frame vertical wall 26 on the vehicle front side, and the rear frame 32 forms a closed cross-section together with the frame vertical wall 26 on the vehicle rear side. Furthermore, a middle wall 34 is provided inside each of the front frame 30 and the rear frame 32, and the space inside each of the front frame 30 and the rear frame 32 is divided in two in the vehicle up/down direction by the middle wall 34 (the middle wall 34 of the rear frame 32 is not shown in the drawings).

Furthermore, as shown in FIG. 2, the frame 16 is equipped with a pair of side frames 36. One side frame 36 is also provided on the vehicle lower side of the frame flange 28 on the vehicle left side, and the other side frame 36 is also provided on the vehicle lower side of the frame flange 28 on the vehicle right side. The lengthwise direction of these side frames 36 generally coincides with the vehicle front/rear direction.

Each of these side frames 36 is hollow in cross-section when cut in a direction orthogonal to the vehicle front/rear direction. One side frame 36 forms a closed cross-section together with the frame vertical wall 26 on the vehicle left side, and the other side frame 36 forms a closed cross-section together with the frame vertical wall 26 on the vehicle right side. Furthermore, plural middle walls 38 are provided inside each of these side frames 36, and the space inside each of the side frames 36 is divided in three in the vehicle width direction by the middle walls 38.

The tray 18, which configures the case 14 together with the frame 16, is entirely made of a metal such as aluminum or an alloy configured to include aluminum. As shown in FIG. 2, the tray 18 overall is in the shape of a box that opens in the vehicle upward direction, and tray flanges 40 extend from the upper end portion of the tray 18 outward of the tray 18 in directions orthogonal to the vehicle up/down direction. As shown in FIG. 1, the tray 18 is disposed inside the frame body 20 of the frame 16. In a state in which the tray 18 is disposed inside the frame body 20, a tray bottom portion 42 serving as a mount portion of the tray 18 and configuring a refrigerant flow passage is in contact with the frame bottom portion 22 of the frame body 20. The tray bottom portion 42 and the frame bottom portion 22 are integrally welded to each other at welded portions 44.

Plural cross reinforcements 46 serving as reinforcement portions are provided at an inner side of the tray 18. The lengthwise direction of these cross reinforcements 46 coincides with the vehicle width direction. The cross reinforcements 46 are rectangular in cross-section when cut in a direction orthogonal to their lengthwise direction, and are hollow throughout their lengthwise direction. A middle wall 50 is provided inside each of the cross reinforcements 46, and the space inside each of the cross reinforcements 46 is divided in two in the vehicle up/down direction by the middle wall 50.

Cross flanges 48 extend in the vehicle forward direction from the vehicle front-side end portions of the vehicle lower-side ends of the cross reinforcements 46, and cross flanges 48 extend in the vehicle rearward direction from the vehicle rear-side end portions of the vehicle lower-side ends of the cross reinforcements 46. The cross flanges 48 are in contact with the tray bottom portion 42 of the tray 18, and the cross flanges 48 and the tray bottom portion 42 are integrally welded to each other at welded portions 52.

Batteries 56 are mounted on the tray bottom portion 42 on the vehicle front/rear direction sides of the cross reinforcements 46. These batteries 56 are, for example, secondary batteries such as lithium ion secondary batteries. The batteries 56 are electrically connected to a motor via a control device, and the motor is driven as a result of power from the batteries 56 being supplied by the control device to the motor. When drive wheels of the vehicle are rotated by driving force output from the motor in this way, the vehicle drives.

A first plate 58 that configures the refrigerant flow passage together with the tray bottom portion 42 is provided on the vehicle lower side of the tray 18. The first plate 58 is, for example, formed by stamping a plate material made of a metal such as aluminum or an alloy configured to include aluminum.

In the first plate 58 are formed plural first recessed portions 60. Each of these first recessed portions 60 is substantially in the shape of a "U" that opens in the vehicle upward direction, and the lengthwise direction of the first recessed portions 60 coincides with the vehicle width direction. These first recessed portions 60 are formed a predetermined interval apart from each other in the vehicle front/rear direction, and the cross reinforcements 46 are disposed on the tray bottom portion 42 of the tray 18 on the vehicle upper sides of the first recessed portions 60.

On the vehicle front sides and the vehicle rear sides of these first recessed portions 60 are formed second recessed portions 62. Each of these second recessed portions 62 is substantially in the shape of a "U" that opens in the vehicle upward direction, and the lengthwise direction of the second recessed portions 62 coincides with the vehicle width direction. The batteries 56 are disposed on the tray bottom portion 42 of the tray 18 on the vehicle upper sides of the second recessed portions 62.

As shown in FIG. 1, parts of the first plate 58 on both vehicle front/rear direction sides of the end portions on the vehicle upper sides of the second recessed portions 62 are in contact with the tray bottom portion 42 of the tray 18 from the vehicle lower side and are integrally welded at welded portions 66 to the tray bottom portion 42. Because of this, the cross-sections formed by the second recessed portions 62 and the tray bottom portion 42 when cut along a direction orthogonal to the vehicle width direction are closed rectangles.

Furthermore, as shown in FIG. 2, on both vehicle width direction sides of each of the first recessed portions 60 are formed third recessed portions 64. Each of the third recessed portions 64 is substantially in the shape of a "U" that opens in the vehicle upward direction, and both vehicle front/rear direction ends of each third recessed portion 64 is continuous with the second recessed portions 62, so that the insides of the second recessed portions 62 and the insides of the third recessed portions 64 communicate with each other.

Moreover, on the vehicle front side that configures the second recessed portion 62 on the vehicle frontmost side are formed a pair of extension portions 80 that extend in the vehicle forward direction. The extension portions 80 are in the shape of a box that opens in the vehicle upward direction, and vehicle rear-side end portions of the extension portions 80 communicate with the second recessed portion 62 on the vehicle frontmost side in the first plate 58.

The extension portions 80 are provided a predetermined distance apart from each other in the vehicle width direction. The extension portion 80 on the vehicle right side is formed along a vertical wall on the vehicle right side of the first plate 58. A vertical wall on the vehicle left side of the extension portion 80 on the vehicle right side extends in the vehicle forward direction, while a vertical wall on the vehicle right side of the extension portion 80 on the vehicle right side gradually slopes in the vehicle leftward direction heading in the vehicle forward direction.

The extension portion 80 on the vehicle left side extends from the vehicle width direction substantially middle portion of the vehicle front-side end of the first plate 58. A vertical wall on the vehicle right side of the extension portion 80 on the vehicle left side extends in the vehicle forward direction, while a vertical wall on the vehicle left side of the extension portion 80 on the vehicle left side gradually slopes in the vehicle rightward direction heading in the vehicle forward direction.

On the vehicle upper sides of both extension portions 80 and on the vehicle lower side of the front frame 30 of the frame 16 is provided a second plate 82 serving as a plate portion. The end portion on the vehicle front side of the second plate 82 is integrally joined to the first plate 58 at a welded portion 84. Furthermore, a pair of hole portions 86 are formed in the second plate 82. One hole portion 86 corresponds to one extension portion 80, and the other hole portion 86 corresponds to the other extension portion 80.

Furthermore, in each of the hole portions 86 is provided an inflow/outflow portion 88. The outer diameter dimension of the inflow/outflow portions 88 is equal to the inner diameter dimension of the hole portions 86. Furthermore, the inflow/outflow portions 88 are pipes that penetrate the hole portions 86 in the vehicle up/down direction, and the vehicle lower-side end portions of the inflow/outflow portions 88 are continuous with the insides of the extension portions 80. These inflow/outflow portions 88 are connected by other pipes or the like to a radiator (heat exchange device) installed in the vehicle, and coolant 70 (see FIG. 1) serving as a refrigerant supplied from the radiator is supplied via another pipe or the like to one inflow/outflow portion 88.

The coolant 70 is, for example, made of a liquid such as water or ethylene glycol. The coolant 70 that has traveled through one hole portion 86 travels through the insides of the second recessed portions 62 and the insides of the third recessed portions 64. When the coolant 70 flows through the insides of the second recessed portions 62, heat is exchanged between the coolant 70 and the batteries 56, whereby the batteries 56 are cooled and the coolant 70 is warmed. The coolant 70 that has been warmed in this way flows out from the other hole portion 86. The coolant 70 that has flowed out from the hole portion 86 flows via a pipe or the like to the radiator. In the radiator, heat is exchanged between, for example, wind passing through the radiator while the vehicle is driving and the coolant 70 flowing in the radiator, whereby the coolant 70 is cooled.

The vehicle lower side of the above configuration is equipped with a protector 72. The protector 72 is made of a metal such as aluminum or iron or an allow that includes such metals, and is secured and supported at its outer peripheral portion to the floor panel or the like of the vehicle. The protector 72 is equipped with a flat plate portion 74. The flat plate portion 74 is formed in the shape of a flat plate that is substantially rectangular in plan view, and is disposed on the vehicle lower side of the first plate 58. The surface on the vehicle upper side of the flat plate portion 74 of the protector 72 is in contact with the vehicle lower-side surfaces of the bottom portions of the first recessed portions 60 of the first plate 58, and the surface on the vehicle upper side of the flat plate portion 74 and the bottom portions of the first recessed portions 60 of the first plate 58 are integrally secured to each other by bolts 76 serving as fastening members.

Here, the first recessed portions 60 are formed deeper than the second recessed portions 62 and the third recessed portions 64. For this reason, the bottom portions of the first recessed portions 60 are disposed more in a vehicle downward direction than the bottom portions of the second recessed portions 62 and the bottom portions of the third recessed portions 64. Consequently, the flat plate-shaped flat plate portion 74 is in contact with the bottom portions of the first recessed portions 60, whereby the flat plate portion 74 is spaced apart from the bottom portions of the second recessed portions 62 and the bottom portions of the third recessed portions 64 in the vehicle downward direction.

Action and Effects of Embodiment

In this embodiment, the batteries 56 are mounted on the tray bottom portion 42 of the tray 18 of the case 14. The batteries 56 sometimes give off heat due to charging, for example. Here, on the vehicle lower side of the batteries 56, the coolant 70 flows through the second recessed portions 62 of the first plate 58. When the temperature of the coolant 70 is lower than the temperature of the batteries 56, heat is exchanged between the coolant 70 and the batteries 56. Because of this, the batteries 56 are cooled and the temperature of the batteries 56 can be inhibited from rising.

When the vehicle is driving, sometimes the underbody of the vehicle comes into contact with the road surface and receives loads from the vehicle lower side due to unevenness in the road surface, for example. Here, the protector 72 is provided on the vehicle lower side of the case 14. For this reason, the case 14 can be prevented from directly contacting the road surface, and loads from the road surface can be prevented from being directly input to the case 14. Furthermore, the flat plate portion 74 of the protector 72 is provided on the vehicle lower side of the first plate 58. For this reason, loads from the road surface can be prevented from being directly input to the first plate 58 and particularly the second recessed portions 62 and the third recessed portions 64.

The second recessed portions 62 and the third recessed portions 64 of the first plate 58 configure the flow passage of the coolant 70 together with the tray bottom portion 42 of the tray 18. Consequently, loads from the road surface can be prevented from being directly input to the second recessed portions 62 and the third recessed portions 64, whereby the second recessed portions 62 or the third recessed portions 64 can be inhibited from being deformed by loads from the road surface. Because of this, the flow of the coolant 70 can be inhibited from stagnating, and the coolant 70 can be inhibited from leaking to an outside of the second recessed portions 62 or the third recessed portions 64, due to deformation of the second recessed portions 62 or the third recessed portions 64.

Furthermore, the flat plate portion 74 of the protector 72 is spaced apart from the bottom portions of the second recessed portions 62 and the bottom portions of the third recessed portions 64 in the vehicle downward direction. For this reason, loads from the road surface input to the flat plate portion 74 of the protector 72 can be inhibited from spreading to the bottom portions of the second recessed portions 62 or the bottom portions of the third recessed portions 64. Because of this, the second recessed portions 62 or the third recessed portions 64 can be effectively inhibited from being deformed by loads from the road surface. Because of this, the flow of the coolant 70 can be inhibited from stagnating, and the coolant 70 can be inhibited from leaking to the outside of the second recessed portions 62 or the third recessed portions 64, due to deformation of the second recessed portions 62 or the third recessed portions 64.

Furthermore, the flat plate portion 74 of the protector 72 is secured by the bolts 76 to the bottom portions of the first recessed portions 60 of the first plate 58. Moreover, the parts of the first plate 58 on both vehicle front/rear direction sides of the end portions on the vehicle upper sides of the first recessed portions 60 are integrally welded at the welded portions 66 to the tray bottom portion 42 of the tray 18. For this reason, loads from the road surface input to the flat plate portion 74 of the protector 72 spread to the bottom portions of the first recessed portions 60 of the first plate 58 and further spread to the tray bottom portion 42 of the tray 18. Because of this, loads from the road surface can be dispersed to the tray 18.

Moreover, the tray bottom portion 42 of the tray 18 is integrally welded at the welded portions 44 to the frame bottom portion 22 of the frame 16. Because of this, loads from the road surface can be dispersed to the frame 16, whose rigidity is set higher than that of the tray 18 and the first plate 58, and loads from the road surface can be supported by the frame 16.

Furthermore, the tray bottom portion 42 of the tray 18 is integrally welded at the welded portions 52 to the cross reinforcements 46. Because of this, loads from the road surface can be dispersed to the high-strength cross reinforcements 46 provided to reinforce the case 14, and loads from the road surface can be supported by the cross reinforcements 46.

Moreover, the protector 72 is secured by the bolts 76 to the first plate 58. For this reason, holes for passing through and disposing the bolts 76 or the like do not need to be formed in the tray 18. Because of this, watertightness on the tray bottom side 42 of the tray 18 can be enhanced.

Furthermore, in this embodiment, the flow passage of the coolant 70 is configured by the second recessed portions 62 and the third recessed portions 64 of the first plate 58 and the tray bottom portion 42 of the tray 18. In this configuration, the tray bottom portion 42 is directly cooled by the coolant 70. Because of this, the batteries 56 can be efficiently cooled.

Moreover, in a configuration where a tubular flow passage for the coolant 70 is disposed on the vehicle lower side of the tray bottom portion 42 of the tray 18, a heat conducting member is provided between the flow passage and the tray bottom portion 42 to enhance the efficiency with which the tray bottom portion 42 is cooled, but in this embodiment the coolant 70 directly cools the tray bottom portion 42, so such a heat conducting member becomes unnecessary and a reduction in the number of parts becomes possible.

Furthermore, the inflow/outflow portions 88 communicate with the flow passage of the coolant 70 in the first plate 58 from the vehicle upper side, and the coolant 70 flows into the flow passage of the coolant 70 in the first plate 58 via the inflow/outflow portions 88 or flows out from the flow passage of the coolant 70 to the vehicle upper side via the inflow/outflow portions 88. In this way, the inflow/outflow portions 88 communicate with the flow passage of the coolant 70 in the first plate 58 from the vehicle upper side. For this reason, ground clearance from the road surface can be ensured, and loads can be inhibited from spreading to the flow passage of the coolant 70 in the first plate 58.

Moreover, the front frame 30 is provided on the vehicle front side of the tray 18. Because of this, the tray 18 is reinforced by the front frame 30. Furthermore, the inflow/outflow portions 88 are set on the vehicle front side of the front frame 30. For this reason, ground clearance from the road surface for the flow passage of the coolant 70 in the first plate 58 can be even more efficiently ensured, and loads can be even more effectively inhibited from spreading to the flow passage of the coolant 70 in the first plate 58.

Furthermore, private passenger vehicles have a heat exchanger such as a radiator provided on the vehicle front side of the front frame 30. For this reason, access by the coolant 70 to the heat exchanger becomes easy by virtue of the extension portions 80 extending in the vehicle forward direction from the first plate 58.

Moreover, the flow passage of the coolant 70 in the first plate 58 is equipped with the extension portions 80 that extend to the inflow/outflow portions 88. For this reason, the inflow/outflow portions 88 may be configured to open at the vehicle upper sides of the extension portions 80. For this reason, the configuration of the inflow/outflow portions 88 can be made simple.

Furthermore, the flow passage of the coolant 70 and the extension portions 80 in the first plate 58 are open on their vehicle upper sides. An opening on the vehicle upper side of the flow passage of the coolant 70 in the first plate 58 is closed by the tray bottom portion 42 of the tray 18. For this reason, the number of members between the batteries 56 and the refrigerant can be reduced, and the efficiency with which the batteries 56 are cooled is enhanced. Openings on the vehicle upper sides of the extension portions 80 are closed by the second plate 82. Here, the regions of the openings on the vehicle upper sides of the extension portions 80 that do not coincide with the tray bottom portion 42 in the vehicle up/down direction may also be closed by the second plate 82. For this reason, the extension portions 80 can be integrated with the flow passage of the coolant 70 in the first plate 58, and the configurations of the flow passage of the coolant 70 and the extension portions 80 in the first plate 58 can be simplified.

In this embodiment, the flow passage of the coolant 70 is configured by the tray bottom portion 42 of the tray 18 and the second recessed portions 62 of the first plate 58. However, a tubular flow passage for the coolant 70 may also be provided separately from the tray 18, so that the tray bottom portion 42 is indirectly cooled by the coolant 70 via the tubular flow passage.

Furthermore, in this embodiment, the first plate 58 is integrally secured, via the tray bottom portion 42 of the tray 18, to the frame bottom portion 22 of the frame 16 and the cross reinforcements 46. However, the first plate 58 does not need to be secured to the frame bottom portion 22 and does not need to be secured to the cross reinforcements 46.

Moreover, in this embodiment, the liquid coolant 70 serves as the refrigerant. However, the refrigerant may also be a gas and is not limited to a specific form of refrigerant.

Furthermore, in this embodiment, the case 14 is in the shape of a box that opens in the vehicle upward direction. However, the case 14 in this embodiment may also be a lower case, with a separate upper case being provided to cover, from the vehicle upper side, and seal the lower case.

Moreover, in this embodiment, the frame 16 is equipped with the front frame 30, the rear frame 32, the side frame 36 on the vehicle left side, and the side frame 36 on the vehicle right side. However, the frame 16 may be equipped with at least one of the front frame 30, the rear frame 32, the side frame 36 on the vehicle right side, or the side frame 36 on the vehicle right side.

Furthermore, the inflow/outflow portions 88 are provided on the vehicle front side of the first plate 58. However, the inflow/outflow portions 88 may also be provided on the vehicle rear side of the first plate 58, or the vehicle left side of the first plate 58, or the vehicle right side of the first plate 58.

What is claimed is:

1. A vehicle underbody structure comprising:
    a case that is provided on a vehicle lower side of a vehicle and has a mount portion on which batteries are mounted;
    a refrigerant flow passage that is provided on the vehicle lower side of the case and in which heat exchange can take place between the batteries on the mount portion and a refrigerant; and
    inflow/outflow portions that communicate with the refrigerant flow passage from a vehicle upper side and allow the refrigerant to flow in or flow out between an outside of the refrigerant flow passage and the refrigerant flow passage, wherein:
    the refrigerant flow passage is equipped with extension portions that extend to the inflow/outflow portions,
    the refrigerant flow passage and the extension portions are open on their vehicle upper sides,
    an opening on the vehicle upper side of the refrigerant flow passage is closed by the mount portion, and
    openings on the vehicle upper sides of the extension portions are closed by a plate portion.

2. The vehicle underbody structure of claim 1, further comprising a frame that is provided on at least one of a vehicle front/rear direction outer side or a vehicle right/left direction outer side of the case and reinforces the case, wherein the inflow/outflow portions are set on at least one of the vehicle front/rear direction outer side or the vehicle right/left direction outer side of the frame.

3. The vehicle underbody structure of claim 2, wherein each of the frame and the inflow/outflow portions is provided at a vehicle front side of the case.

4. The vehicle underbody structure of claim 1, wherein the refrigerant flow passage is configured by the mount portion and a first plate provided on the vehicle lower side of the mount portion.

5. The vehicle underbody structure of claim 4, wherein:
a protector is provided on the vehicle lower side of the case,
plural first recessed portions are formed in the first plate, and
the protector and the plural first recessed portions are integrally secured to each other by fastening members.

6. The vehicle underbody structure of claim 5, wherein:
plural second recessed portions are also formed in the first plate, and
the protector is spaced apart from the plural second recessed portions in a vehicle downward direction.

7. The vehicle underbody structure of claim 1, wherein plural reinforcement portions that reinforce the case are provided at an inner side of the mount portion.

8. A vehicle underbody structure comprising:
a case that is provided on a vehicle lower side of a vehicle and has a mount portion on which batteries are mounted;
a refrigerant flow passage that is provided on the vehicle lower side of the case and in which heat exchange can take place between the batteries on the mount portion and a refrigerant; and
inflow/outflow portions that communicate with the refrigerant flow passage from a vehicle upper side and allow the refrigerant to flow in or flow out between an outside of the refrigerant flow passage and the refrigerant flow passage, wherein:
the refrigerant flow passage is configured by the mount portion and a first plate provided on the vehicle lower side of the mount portion,
a protector is provided on the vehicle lower side of the case,
plural first recessed portions are formed in the first plate, and
the protector and the plural first recessed portions are integrally secured to each other by fastening members.

9. The vehicle underbody structure of claim 8, further comprising a frame that is provided on at least one of a vehicle front/rear direction outer side or a vehicle right/left direction outer side of the case and reinforces the case, wherein the inflow/outflow portions are set on at least one of the vehicle front/rear direction outer side or the vehicle right/left direction outer side of the frame.

10. The vehicle underbody structure of claim 9, wherein each of the frame and the inflow/outflow portions is provided at a vehicle front side of the case.

11. The vehicle underbody structure of claim 8, wherein:
plural second recessed portions are also formed in the first plate, and
the protector is spaced apart from the plural second recessed portions in a vehicle downward direction.

12. The vehicle underbody structure of claim 8, wherein plural reinforcement portions that reinforce the case are provided at an inner side of the mount portion.

* * * * *